United States Patent
Zuzelo (10) Patent No.: US 9,216,481 B1
(45) Date of Patent: Dec. 22, 2015

(54) METHOD OF PRODUCING A CIRCULAR SAW BLADE HAVING REVERSIBLE ARBOR MOUNTING HOLE THAT RECEIVES AN ASYMMETRICAL ARBOR

(76) Inventor: Edward A. Zuzelo, Conshohocken, PA (US)

( * ) Notice: Subject to any disclaimer, the term of this patent is extended or adjusted under 35 U.S.C. 154(b) by 1181 days.

(21) Appl. No.: 12/718,917

(22) Filed: Mar. 5, 2010

Related U.S. Application Data (63) Continuation-in-part of application No. 11/108,136, filed on Apr. 18, 2005, now abandoned.

(51) Int. Cl.
  *B26D 1/14* (2006.01)
  *B23P 15/28* (2006.01)
  *B23P 15/40* (2006.01)

(52) U.S. Cl.
  CPC .............. *B23P 15/28* (2013.01); *B23P 15/406* (2013.01)

(58) Field of Classification Search
  USPC ............ 83/665, 666, 698.41; 125/15; 76/112, 76/37, 38, 48, 50, 115
  See application file for complete search history.

(56) References Cited

U.S. PATENT DOCUMENTS

| | | | |
|---|---|---|---|
| 2,572,042 A | 10/1951 | Martin | |
| 2,649,868 A | 8/1953 | Gommel | |
| 2,795,247 A | 6/1957 | Topolinski | |
| 2,822,648 A | 2/1958 | Metzger | |
| 3,869,795 A | 3/1975 | Treace | |
| 4,706,386 A | 11/1987 | Wiley | |
| 4,913,022 A * | 4/1990 | Kuklinski | ................ 83/849 |
| 5,303,688 A | 4/1994 | Chiuminatta et al. | |
| 5,373,834 A | 12/1994 | Chiuminatta et al. | |
| 5,477,845 A | 12/1995 | Zuzelo | |
| 5,603,310 A | 2/1997 | Chiuminatta et al. | |
| 5,660,161 A | 8/1997 | Chiuminatta et al. | |

* cited by examiner

*Primary Examiner* — Sean Michalski
(74) *Attorney, Agent, or Firm* — LaMorte & Associates, P.C.

(57) ABSTRACT

A method of creating an arbor mounting hole in a blade. The arbor mounting hole is created by making a first model of an arbor mounting hole that fits onto the asymmetrical mounting arbor. The first model has a first long flat edge and a first center of rotation. A mirror image of the first model is used to create a second model. The second model has a second long flat edge and a second center of rotation. The first model and the second model are superimposed so that the first center of rotation aligns with the second center of rotation and the first long flat edge aligns with the second long flat edge. The superimposition creates a compound model. A symmetric arbor model is formed about the compound model. The symmetric arbor model is cut into the blade.

15 Claims, 8 Drawing Sheets

METHOD OF PRODUCING A CIRCULAR SAW BLADE HAVING REVERSIBLE ARBOR MOUNTING HOLE THAT RECEIVES AN ASYMMETRICAL ARBOR

RELATED APPLICATIONS

This application is a continuation-in-part of U.S. patent application Ser. No. 11/108,136, to Zuzelo, entitled System And Method For Producing A Reversible Arbor Mounting Hole In A Circular Saw Blade That Receives An Asymmetrical Arbor, filed Apr. 18, 2005 now abandoned.

BACKGROUND OF THE INVENTION

1. Field of the Invention

The present invention relates to the arbor mounting hole structure of circular saw blades. More particularly, the present invention relates to circular saw blades that have arbor mounting holes that can be attached to diverse cutting machines having asymmetrical drive arbor configurations.

2. Prior Art Description

There are many types of cutting machines that utilize circular saw blades. Circular saw blades are typically round blades that have cutting teeth along the periphery of the blade. Traditionally, an arbor mounting hole is disposed in the center of the blade. The arbor mounting hole passes over a rotating drive arbor of the cutting machine, thereby interconnecting the drive arbor of the cutting machine to the circular saw blade. The interconnection of the blade arbor mounting hole with the drive arbor of the cutting machine serves two purposes. First, the interconnection of the drive arbor with the blade arbor mounting hole centers the blade so that the blade is balanced when it spins. Second, the interconnection of the drive arbor with the blade arbor mounting hole enables the drive arbor to turn the blade.

The most common type of arbor mounting hole used on a circular saw blade is a round hole that is located in the geometric center of the circular saw blade. Such arbor mounting holes pass over round cutting machine arbors that have a diameter close to that of the blade arbor mounting hole. In such round arbor mounting hole blades, any blade that has a round arbor mounting hole of the proper diameter can be mounted on the cutting machine.

In certain applications, non-circular arbors are used on cutting machines to provide a more positive connection between a circular saw blade and the rotating arbor. By using non-round arbors on the cutting machine and non-round arbor mounting holes in the blades, the blades are prevented from rotating around the arbor, should the saw blade bind on the material it is cutting. Such non-round arbor mounting holes are typically symmetrically disposed around the geometric center of the circular saw blade. Circular saw blades with symmetrical square-shaped arbor mounting holes are exemplified by U.S. Pat. No. 3,869,795 to Treace, entitled, Cutting Blade For Use With An Oscillating Cast Cutter; U.S. Pat. No. 4,706,386 to Wiley, entitled Quick Change Mechanism For Diamond Arbor Circular Saw Blades And Other Spinning Disc Devices; and U.S. Pat. No. 2,822,648 to Metzger, entitled Rotary Tool Mounting And Method Of Assembling The Same.

Circular saw blades with symmetrical diamond shaped arbor mounting holes are exemplified by U.S. Pat. No. 2,795,247 to Topolinski, entitled Reversible Circular Saw; and U.S. Pat. No. 2,649,868 to Gommel, entitled Mounting Rotors on Arbors of Various Transaxial Contours.

In the wide cross-section of industry that produces cutting machines, some companies have developed cutting machines with asymmetrical drive arbors that are proprietary to the manufacturer. Such asymmetrical drive arbors only accept circular saw blades having arbor mounting holes that are specifically manufactured for that cutting machine. Accordingly, a customer must purchase specialized blades from a specific manufacturer in order to utilize the cutting machine manufactured by that manufacturer. In many instances, the arbor mounting hole on such blades is an asymmetric triangle. Such a configuration is found in U.S. Pat. No. 5,477,845, to Zuzelo, entitled Saw Blade And Mounting Means For The Same. Other blades have arbor mounting holes that are combinations of straight sides and curved sides. Such prior art blades are exemplified by U.S. Pat. No. 2,572,042 to Martin, entitled Means For Mounting Cutting Blades On Shafts; U.S. Pat. No. 5,603,310 to Chiuminatta, entitled Mounting Arbor For Saw Cutting Blades; U.S. Pat. No. 5,373,834 to Chiuminatta, entitled Mounting Arbor For Saw Cutting Blades; U.S. Pat. No. 5,303,688 to Chiuminatta, entitled Mounting Arbor For Saw Cutting Blades; and U.S. Pat. No. 5,660,161 to Chiuminatta, entitled Mounting Arbor For Saw Cutting Blades.

A problem with asymmetrical arbors is that the blade that fits on such a specialized arbor only fits in one direction. Due to the asymmetrical shape of the arbor, the blade cannot be flipped and remounted. Saw blades with asymmetrical mounting holes are therefore limited to rotate in a single direction.

With many styles of saw blades, a contractor often reverses the direction of the blade. In many circumstances the ability to turn a blade can double the life of the blade. A need therefore exists for a circular saw blade that can fit onto an asymmetrical arbor, yet can also be flipped and readily mounted to that same asymmetrical arbor. This need is met by the present invention as described and claimed below.

SUMMARY OF THE INVENTION

The present invention is a circular blade for a cutting machine having an asymmetrical mounting arbor and the method of creating an arbor mounting hole in such a blade. The arbor mounting hole is designed to engage an asymmetrical mounting arbor of the type that is generally triangular having a long side, a short side, an intermediate side, and a center of rotation. Since the asymmetrical mounting arbor is generally triangular, its short side meets its intermediate side at a salient point opposite its long side.

The arbor mounting hole in the blade has a flat bottom edge. The flat bottom edge has a midpoint and two ends. The midpoint is intersected by an imaginary symmetry line that is perpendicular to the flat bottom edge.

Contoured edges are symmetrical formed about the imaginary symmetry line. The imaginary symmetry line extends through the center of rotation of the asymmetrical mounting arbor when the arbor mounting hole receives the asymmetrical mounting arbor.

The arbor mounting hole is created by determining a first cross-sectional model of an arbor mounting hole that fits onto the asymmetrical mounting arbor of the cutting machine. Due to the shape of the asymmetrical mounting arbor, the first configuration will have a first long flat edge and a first center of rotation. A mirror image of the first cross-sectional model is used to create an inverted cross-sectional model. The inverted cross-sectional model, being a mirror image of the first configuration, also fits onto the asymmetrical mounting arbor of the cutting machine. Furthermore, being a mirror image of the first cross-sectional model, the second configuration has a second long flat edge and a second center of rotation.

The first cross-sectional model and the inverted cross-sectional model are superimposed so that the first center of rotation aligns with the second center of rotation and the first long flat edge aligns with the second long flat edge. The superimposition creates a compound model. An arbor model is than formed around the compound model that engages at least three sides of the compound model. The arbor model is cut into the circular blade.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be utilized on many types of circular saw blades that are rotated by cutting machines, such as wood cutting blades, that only cut in one direction, the present invention is particularly well suited for use on blades of the type that can cut in two directions and therefore can be reversed. Such reversible blades include diamond abrasion blades, composite masonry blades and composite metal grinding blades.

Figure 1:
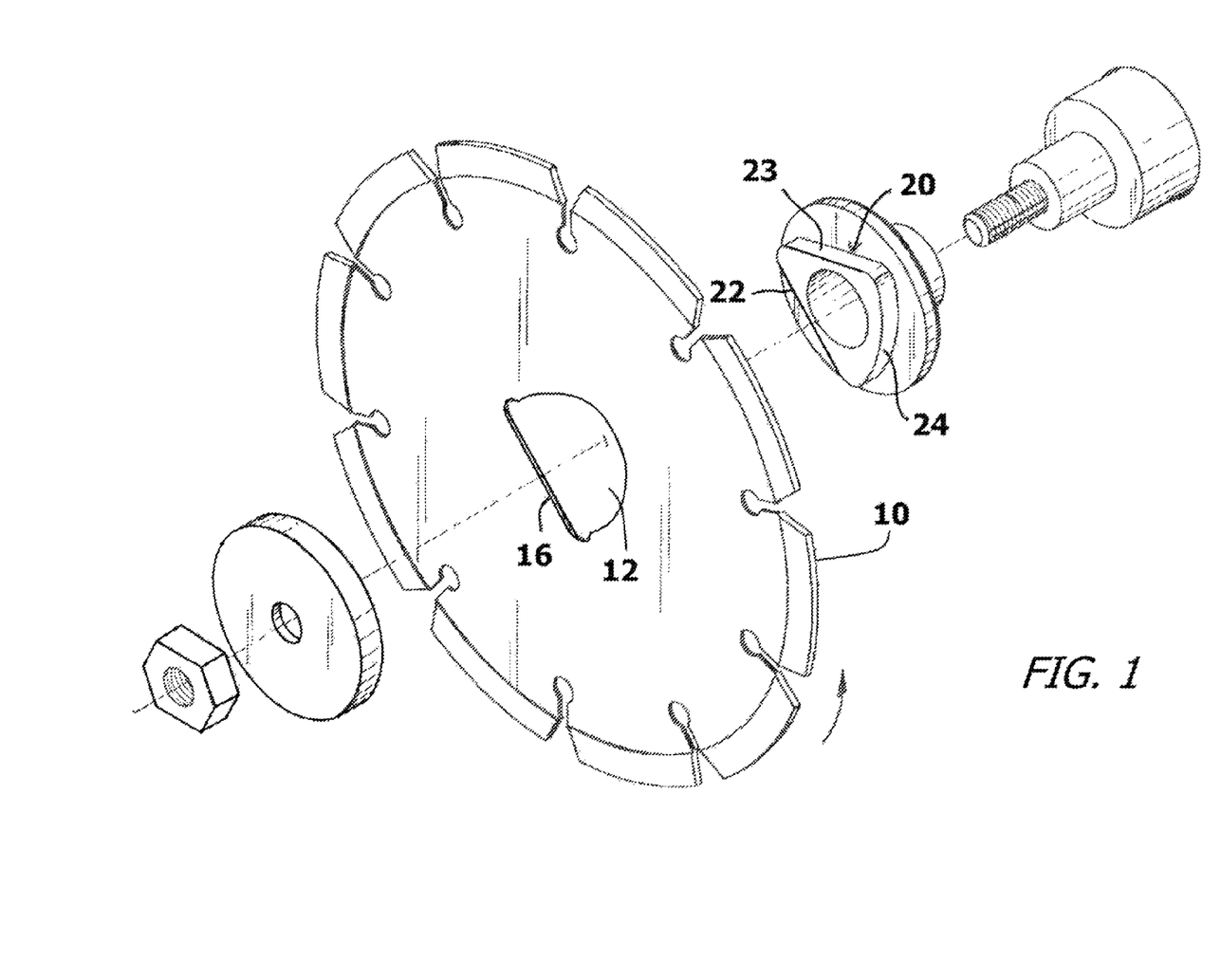
FIG. 1 is a front view of a circular blade containing a compound arbor mounting hole.
Figure 2:
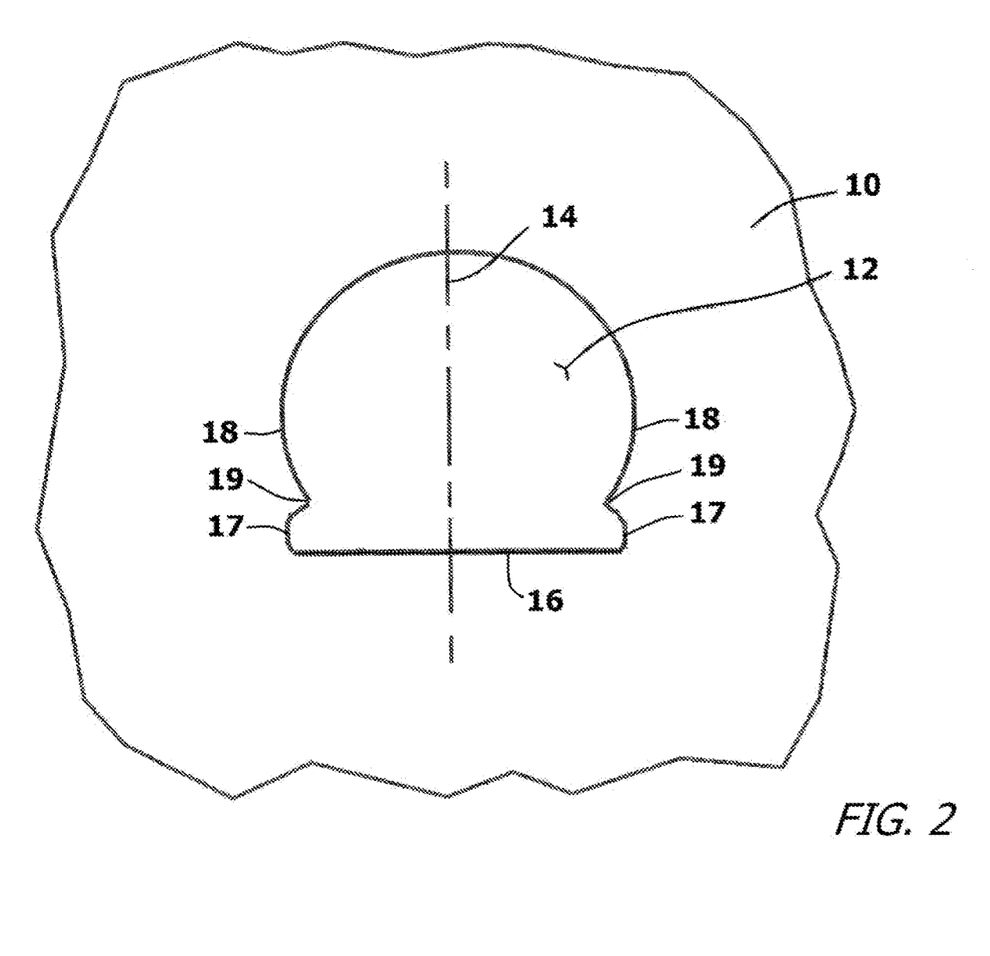
FIG. 2 is an enlarged view of the exemplary compound arbor mounting hole shown in FIG. 1.

Referring to both FIG. 1 and FIG. 2, an exemplary embodiment of a circular saw blade 10 is shown having an arbor mounting hole 12 that is formed in accordance with the present invention. The compound arbor mounting hole 12 is generally shaped like the Greek letter omega, having a flat bottom, curved top, and indentations along the sides. The arbor mounting hole 12 is symmetrically disposed on either side of an imaginary mid-axis 14. As such, the dimensions of the arbor mounting hole 12 are identical on either side of the mid-line 14, except that those dimensions are mirror images.

The arbor mounting hole 12 is defined by a long flat edge 16. The long flat edge 16 lay perpendicular to the mid-axis 14 of the arbor mounting hole 12. A curved top edge 18 is symmetrically formed about the mid-axis 14 so that the curved top edge 18 is mirrored on either side of the mid-axis 14. Small curved edges 17 join the ends of the curved top edge 18 to the long flat edge 16. This creates two inwardly extending protrusions 19 in the arbor mounting hole 12. The shape of the curved top edge 18 is determined by the shape of the asymmetrical arbor being mounted, as is later explained.

Figure 3:
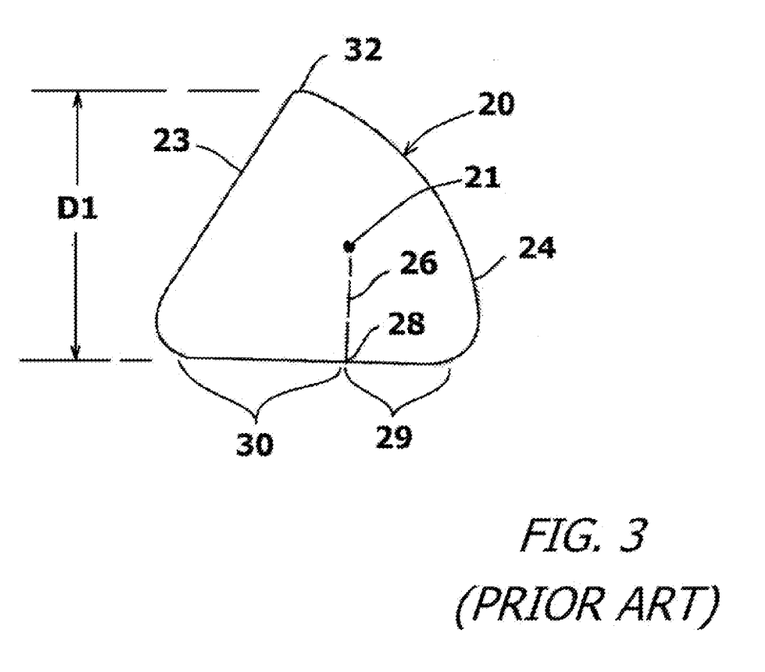
FIG. 3 is a front view of a prior art mounting arbor.

Referring to FIG. 3 in conjunction with FIG. 1, a typical prior art asymmetrical arbor 20 is shown. The asymmetrical arbor 20 is generally triangular in shape having three sides of dissimilar length. One or more of the sides can be curved. The asymmetrical arbor 20 has a center point of rotation 21 about which it spins.

Because the three sides of the mounting arbor have dissimilar lengths, one of the sides is the longest side 22. Similarly, one of the sides is the shortest side 23 and one of the sides is an intermediate side 24.

An imaginary line 26 is drawn from the center point of rotation 21 to the longest side 22, wherein the imaginary line 26 intersects the longest side 22 at a perpendicular. The imaginary line 26 intersects the longest side 22 at an intersection point 28. The intersection point 28 may or may not be in the center of the longest side 22. The intersection point 28 divides the longest side 22 into two segments 29, 30, wherein the two segments 29, 30 are on opposite sides of the intersection point 28. The two segments include a short segment 29 and a long segment 30.

Since the asymmetrical arbor 20 is triangular, there exists one salient point 32 that lay opposite the longest side 22. The opposite salient point 32 is the junction between the short side 23 and the intermediate side 24 of the asymmetrical arbor 20. The opposite salient point 32 is a distance D1 from the longest side.

Figure 4:
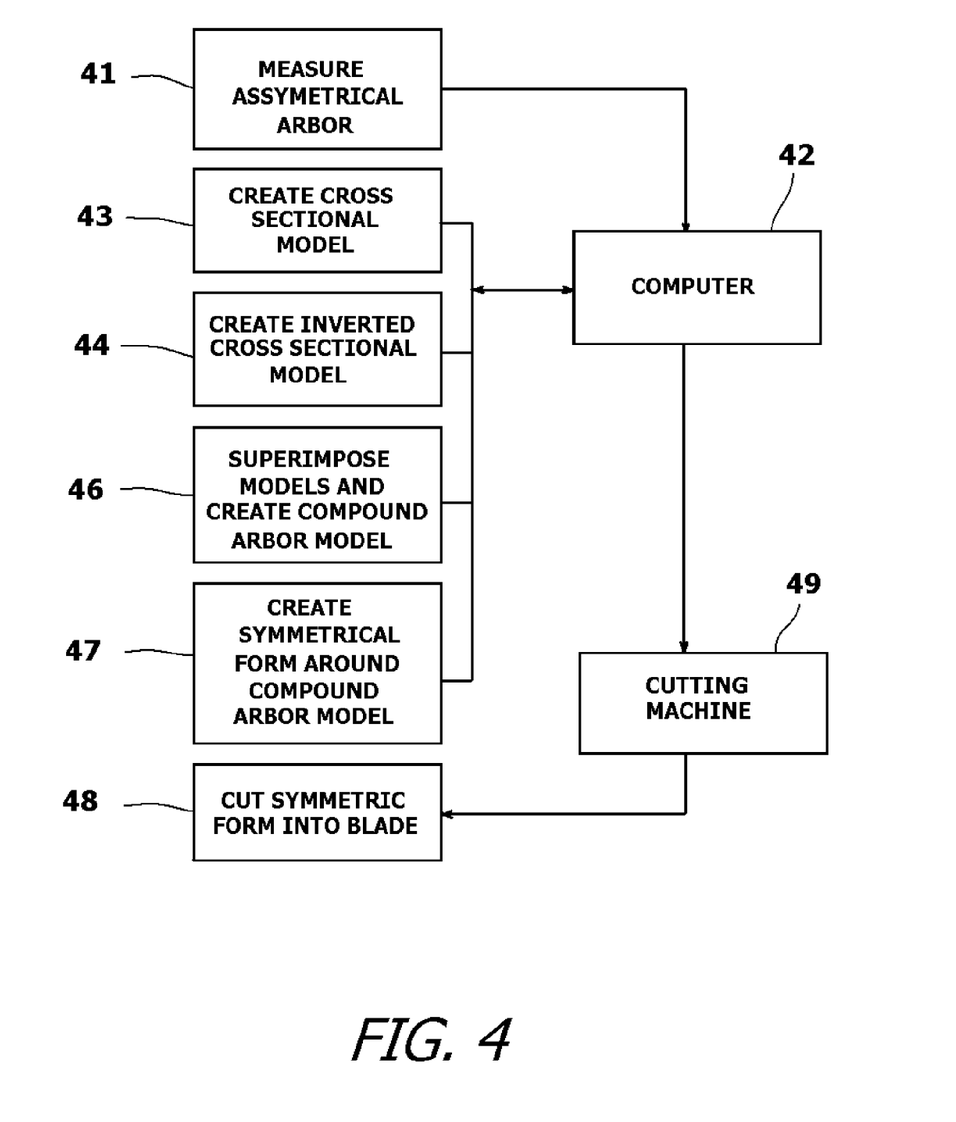
FIG. 4 is a block diagram illustrating the claimed methodology of creating a mounting arbor.
Figure 5:
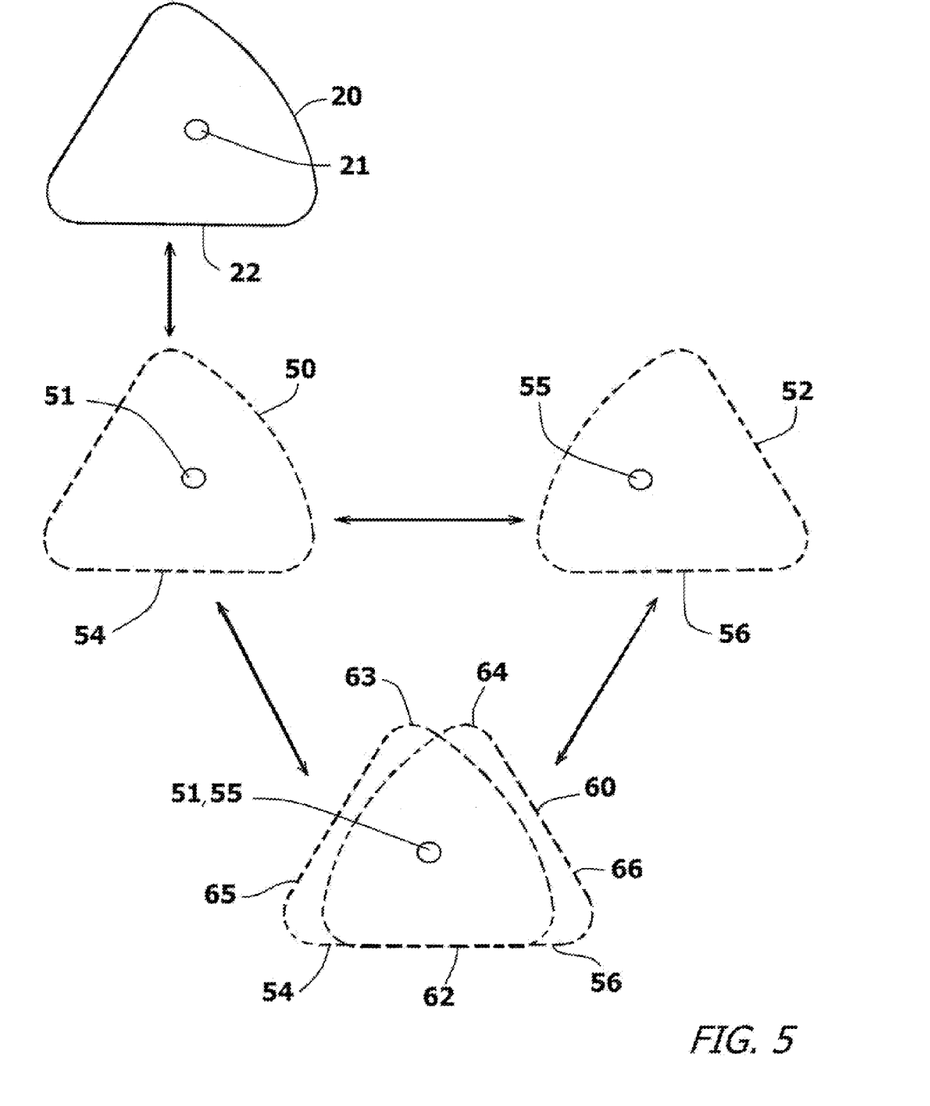
FIG. 5 is a schematic illustrating the methodology of forming a compound arbor model.

Referring to FIG. 4, the overall method of producing the present invention arbor mounting hole 12 is outlined. In FIG. 5, the effects of the first steps outlined by FIG. 4 are illustrated. Referring now to both FIG. 4 and FIG. 5 in conjunction with FIG. 3, it can be seen that the cross-sectional dimensions of a particular asymmetrical arbor 20 are measured. See Block 41. Measurements can be done manually or can be conducted by an electronic scanner. From the measurements, the longest side 22 of the arbor 20 becomes known. The distance D1 between the longest side 22 and the position of the opposite salient point 32 also becomes known. Additionally, the intersection point 28 and the length of the long segment 30 of the longest side 22 become known. All of these measurements are entered into a computer that is running a commercial computed aid design/computer aided manufacturing (CAD/CAM) program, such as Solidworks®.

Using the computer 42, a virtual first cross-sectional model 50 of the asymmetrical arbor 20 is created. See Block 43. As is indicated by Block 44, the virtual first cross-sectional model 50 is then flipped to create a virtual inverted cross-sectional model 52, wherein the inverted cross-sectional model 52 is a mirror image of the first cross-sectional model 50.

A virtual compound arbor model 54 is created using both the first cross-sectional model 50 and the inverted cross-sectional model 52. See Block 46. The first cross-sectional model 50 of the selected asymmetrical arbor 20 has a center point of rotation 51 and a longest side 54 that corresponds directly to the center point of rotation 21 and longest side 22 of the actual mounting arbor 20. The inverted cross-sectional model 52 has a mirrored center point of rotation 55 and a mirrored longest side 56. The first cross-sectional model 50 and the inverted cross-sectional model 52 are then superimposed so that the two center points of rotation 51, 55 align and the two longest sides 54, 56 overlap. This creates a virtual compound arbor model 60. The compound arbor model 60, therefore, has a long bottom edge 62, two salient points 63, 64 that are opposite from the long bottom edge 62 and two outside edges 65, 66 that extend from the salient points 63, 64 to the long bottom edge 62.

Figure 6:
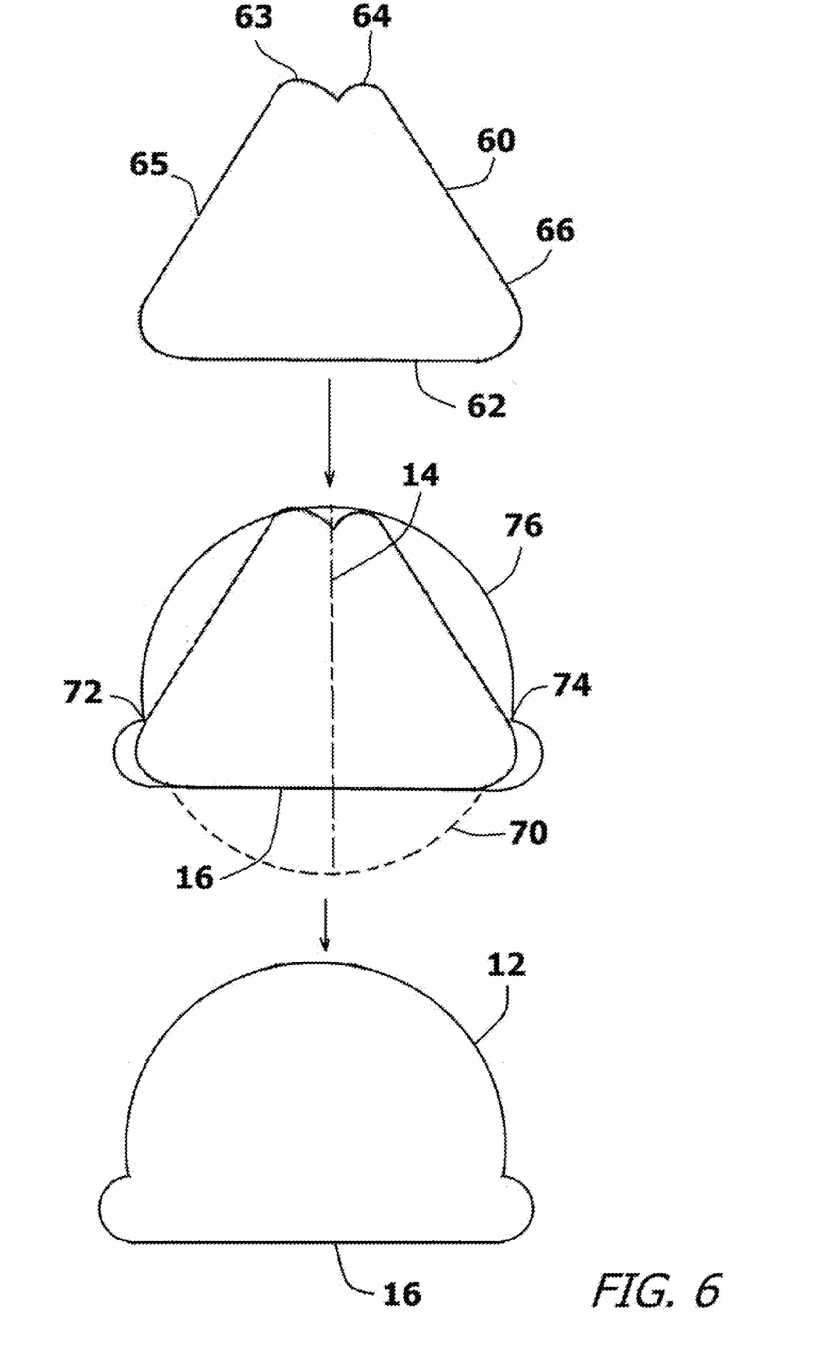
FIG. 6 is a schematic illustrating the methodology of forming an arbor mounting hole using the compound arbor model of FIG. 5.

The arbor mounting hole 12 (FIG. 2) is created to fit the dimensions of the compound arbor model 40. Referring to FIG. 6 and FIG. 4, in conjunction with FIG. 2, it can be seen that the long flat edge 16 of the arbor mounting hole 12 is created by forming a line that is approximately twice as long as the long segment 30 (FIG. 2) of the longest side 22 (FIG. 2) of the asymmetrical arbor 20 (FIG. 2). This line serves as the long flat edge 16 of the arbor mounting hole 12. The long flat edge 16 is bisected by the imaginary mid-axis 14. The imaginary mid-axis 14 is passed through the midpoint of the long flat edge 16. The imaginary mid-axis 14 also intersects the long flat edge 16 at a perpendicular. The long flat edge 16 of the arbor mounting hole 12 is placed immediately adjacent the long bottom edge 62 of the compound arbor model 60. The compound arbor model 60 is then shifted laterally until the imaginary mid-axis 14 passes through the center point of rotation 51, 55 for the compound arbor model 60.

As is indicated by Block 47, the curved top edge 18 of the arbor mounting hole 12 are first formed by creating a geometric shape 70 around the imaginary mid-axis 14 that contacts the salient points 63, 64 of the compound arbor model 60. The geometric shape 70 is mirrored on both sides of the imaginary mid-axis 14. The geometric shape 70 can be comprised of straight lines and/or curved lines. However, the selected geometric shape 70 must contact the salient points 63, 64 of the compound arbor model 60. Furthermore, the geometric shape 70 must also contact the side edges 65, 66 of the compound arbor model.

The geometric shape 70 contacts the side edges 65, 66 of the compound arbor model 60 at two contact points 72, 74. Small curved edges 17 are used to connect the geometric shape 70 at the contact points 72, 64 to the ends of the long flat edge 16. This completes an arbor mounting hole model 76.

As is indicated by Block 48, the arbor mounting hole model 76 is cut into a blade using a cutting machine 49. The cutting machine can be a stamping machine, a water jet-cutting machine, a laser cutting machine, and/or a CNC milling machine. The data corresponding to the arbor mounting hole design 76 is downloaded from the computer 42 to the cutting machine 49. The cutting machine 49 then cuts the arbor mounting hole 12 in the blade to the specifications of the arbor mounting hole model 76 at the appropriate position.

Figure 7:
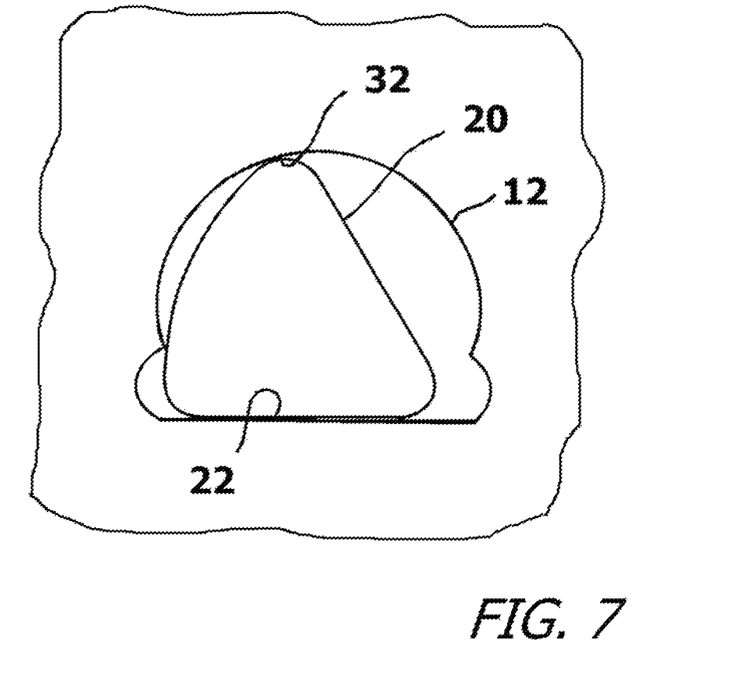
FIG. 7 is a front view of an arbor mounting hole engaging the prior art arbor of FIG. 3.

Referring to FIG. 7, it can be seen that when the asymmetrical arbor 20 is placed in the arbor mounting hole 12, the arbor mounting hole 12 that contacts an asymmetrical arbor 20 in at least three points. The arbor mounting hole 12 contacts the longest side 22 of the asymmetrical arbor 20, the opposite salient point 32 of the asymmetrical arbor 20 and at least one point between the opposite salient point 32 and the longest side 22. Those same three minimum points of contact are maintained even if a circular saw blade 10 containing the arbor mounting hole 12 is flipped and replaced onto the asymmetrical arbor 20.

Figure 8:
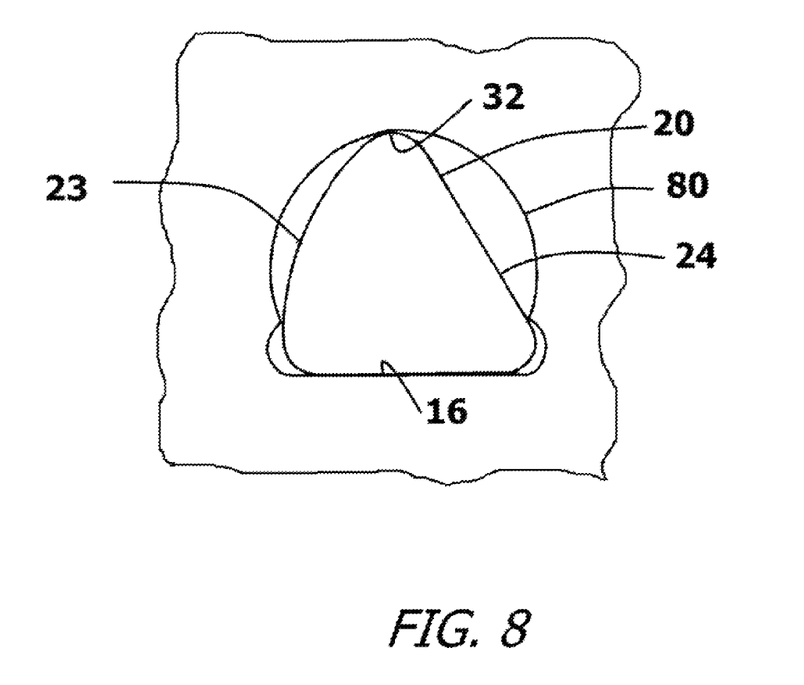
FIG. 8 is a front view of an alternate embodiment of an arbor mounting hole engaging the prior art arbor of FIG. 3.

Referring to FIG. 8, an alternate embodiment of the present invention mounting hole 80 is shown. This alternate embodiment is made in the same manner as that shown in FIG. 7. However, when the point of contact between the salient point 32 and the end of the long flat edge 16 of the asymmetrical arbor 20 is selected, an inward protrusion is designed that not only contacts the short side 23 of the asymmetrical arbor 20, but also contacts the intermediate side 24 of the asymmetrical arbor 20. The arbor mounting hole 80 therefore would contact the exterior of the asymmetrical arbor 20 at four points instead of three. This provides a stronger interconnection between the blade and the mounting arbor.

It will be understood that the embodiments of the present invention that are described and illustrated herein are merely exemplary and a person skilled in the art can make many variations to the embodiments shown without departing from the scope of the present invention. The present invention was illustrated using the mounting arbor configuration of a Soff-Cut® early entry concrete cutting machine. The present invention, however, can be used for many different types of arbors on many different types of cutting machines. All such variations, modifications and alternate embodiments are intended to be included within the scope of the present invention as defined by the appended claims.

What is claimed is:

1. A method of creating an arbor mounting hole for a circular saw blade of a cutting machine, wherein the cutting machine has a generally triangular asymmetrical mounting arbor that embodies a long side, a short side, an intermediate side and a center of rotation, said method comprising the steps of:
   measuring said asymmetrical mounting arbor to collect dimensional data;
   producing a cross-sectional model utilizing said dimensional data of said asymmetrical mounting arbor, wherein said cross-sectional model has a first long flat edge and a first center of rotation;
   inverting said cross-sectional model to produce an inverted cross-sectional model having a second long flat edge and a second center of rotation;
   superimposing said cross-sectional model and said inverted cross-sectional model, wherein said first center of rotation aligns with said second center of rotation and said first long flat edge aligns with said second long flat edge, thereby producing a compound model having at least three sides;
   producing an arbor hole model around said compound model that is dimensioned to contact at least three sides of said compound model, and
   cutting said arbor hole model into a blade.

2. The method according to claim 1, wherein said step of superimposing said cross-sectional model and said inverted cross-sectional model further includes orienting said cross-sectional model and said inverted cross-sectional model to be symmetrically disposed about a common line of symmetry.

3. The method according to claim 2, wherein said common line of symmetry is perpendicular to both said first long side and said second long side.

4. The method according to claim 2, wherein said common line of symmetry passes through a center of rotation for said blade.

5. The method according to claim 1, further including the step of obtaining a reference length from said generally triangular asymmetrical mounting arbor by passing a line perpendicular from said long side through said center of rotation, wherein said line intersects said long side, thereby differentiating said long side into two segments, and wherein said reference length is equal to a longer of said two segments.

6. The method according to claim 5, further including the step of making the flat base of said arbor hole mounting design twice as long as said reference length.

7. The method according to claim 6, wherein said arbor hole model is symmetrically disposed on either side of said common line of symmetry.

8. The method according to claim 1, wherein said step of producing a cross-sectional model includes producing a virtual cross-sectional model on a computer.

9. The method according to claim 8, wherein said step of producing an inverted cross-sectional model includes producing an inverted virtual cross-sectional model on a computer.

10. The method according to claim 9, wherein said step of superimposing said cross-sectional model and said inverted cross-sectional model is accomplished by computer, wherein said compound model is virtual.

11. The method according to claim 10, wherein said arbor hole model is virtually produced on a computer.

12. A method of creating an arbor mounting hole in a reversible blade that mounts on an asymmetrical arbor, said method comprising the steps of:
producing a cross-sectional model of said asymmetrical mounting arbor having a first center of rotation;
inverting said cross-sectional model to produce an inverted cross-sectional model having a second center of rotation;
superimposing said cross-sectional model and said inverted cross-sectional model and aligning said first center of rotation aligns with said second center of rotation, thereby producing a compound model having at least three sides;
producing an arbor hole model around said compound model that is dimensioned to contact at least three sides of said compound model, and
cutting said arbor hole model into a blade.

13. The method according to claim 12, wherein said step of superimposing said cross-sectional model and said inverted cross-sectional model further includes orienting said cross-sectional model and said inverted cross-sectional model to be symmetrically disposed about a common line of symmetry.

14. The method according to claim 13, wherein said common line of symmetry passes through a center of rotation for said blade.

15. The method according to claim 14, wherein said arbor hole model is symmetrically disposed on either side of said common line of symmetry.

\* \* \* \* \*